(12) United States Patent
Rivera (10) Patent No.: US 8,950,989 B1
(45) Date of Patent: Feb. 10, 2015

(54) BILATERAL CARGO STRAP SYSTEM

(71) Applicant: Darrell Toby Rivera, Wimberley, TX (US)

(72) Inventor: Darrell Toby Rivera, Wimberley, TX (US)

(*) Notice: Subject to any disclaimer, the term of this patent is extended or adjusted under 35 U.S.C. 154(b) by 0 days.

(21) Appl. No.: 14/311,992

(22) Filed: Jun. 23, 2014

Related U.S. Application Data (60) Provisional application No. 61/838,803, filed on Jun. 24, 2013.

(51) Int. Cl.
*B60P 7/08* (2006.01)

(52) U.S. Cl.
CPC .................................. *B60P 7/0823* (2013.01)
USPC ............................................ 410/118; 410/97

(58) Field of Classification Search
USPC ..................... 410/96, 97, 100, 117, 118, 129; 248/499
See application file for complete search history.

(56) References Cited

U.S. PATENT DOCUMENTS 7,217,074 B1 * 5/2007 Huber .......................... 410/118

* cited by examiner

*Primary Examiner* — Stephen Gordon (57) ABSTRACT

A bilateral cargo strap system is provided as a means of securing a variety of different cargo within a storage area. The bilateral cargo strap system utilizes a combination of elastic straps with perpendicularly positioned stabilizing rods to improve retention of a variety of cargo within a storage area. The elastic straps extend over the retained cargo and are used as the means of engaging mounting features within the storage area. The stabilizing rods effectively distribute the tension force of the elastic straps over the retained cargo securing it in place within the storage space. The bilateral cargo strap system is versatile and may be used to secure a wide variety of cargo including, but not limited to, kayaks, coolers, bicycles, lumber, and construction equipment.

15 Claims, 10 Drawing Sheets

BILATERAL CARGO STRAP SYSTEM

The current application claims a priority to the U.S. Provisional Patent application Ser. No. 61/838,803 filed on Jun. 24, 2014.

FIELD OF THE INVENTION

The present invention relates generally to a means of securing cargo. More specifically, the present invention relates to a bilateral cargo strap system for securing cargo within a storage area.

BACKGROUND OF THE INVENTION

Modern day vehicles often designate a large amount of interior space for the transportation of cargo. It is common practice to store cargo in specific areas of a vehicle such as a truck bed, vehicle roof, or trunk. However, due to the large amount of available space, cargo is prone to shifting during transportation, particularly if the storage space is not completely occupied. This leaves the cargo susceptible to damage sustained from continuous impacts with the interior walls of the cargo storage area. In certain cases, poorly secured cargo on a vehicle roof may loosen and become lost. Cargo packaging may sustain damage during transportation while fragile contents such as glass may become damaged as well. A common solution for preventing cargo movement during transportation is to bind the cargo to the storage area. This is often achieved by utilizing a wide variety of cables, tie downs, or straps to secure the cargo to the storage area within a vehicle, on a vehicle roof, or a warehouse. These restraints are useful as a user is not required to tie knots and the restraints are capable of absorbing shock without becoming compromised. Additionally, these types of restraints are advantageous due to their ability to secure cargo of irregular shapes. The cables, tie downs, and straps are typically adjustable and durable to secure even the largest and bulkiest cargo. However, due to the nature of these restraints, the restraints themselves are prone to shifting and slipping on the cargo during transportation or stationary storage. As a result, previously secured cargo can become loose and damaged due to movement during transportation. The present invention seeks to address the aforementioned issues relating to cargo transportation and storage as well as enhance and improve upon currently existing solutions.

It is therefore the object of the present invention to provide a bilateral cargo strap system that is able to secure a variety of different cargo within a storage area. The bilateral cargo strap system utilizes a combination of elastic straps with perpendicularly positioned stabilizing rods to improve retention of a variety of cargo within a storage area. The elastic straps extend over the retained cargo and are used as the means of engaging mounting features within the storage area. The stabilizing rods effectively distribute the tension force of the elastic straps over the retained cargo securing it in place within the storage space. The bilateral cargo strap system is versatile and may be used to secure a wide variety of cargo including, but not limited to, kayaks, coolers, bicycles, lumber, and construction equipment.

DETAIL DESCRIPTIONS OF THE INVENTION

All illustrations of the drawings are for the purpose of describing selected versions of the present invention and are not intended to limit the scope of the present invention.

Figure 1:
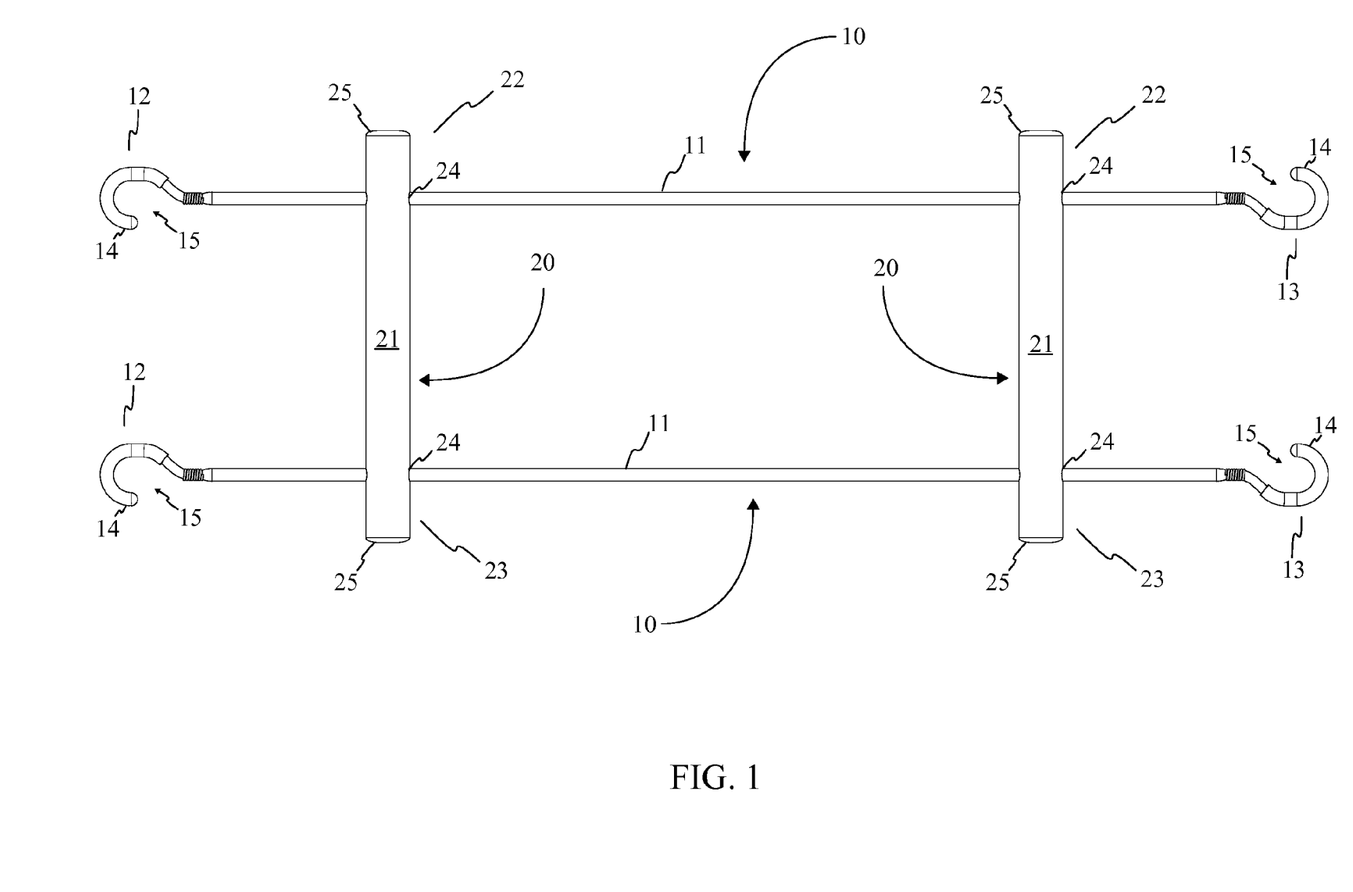
FIG. 1 is a front elevational view displaying the bilateral cargo strap system as per the current embodiment of the present invention.
Figure 2:
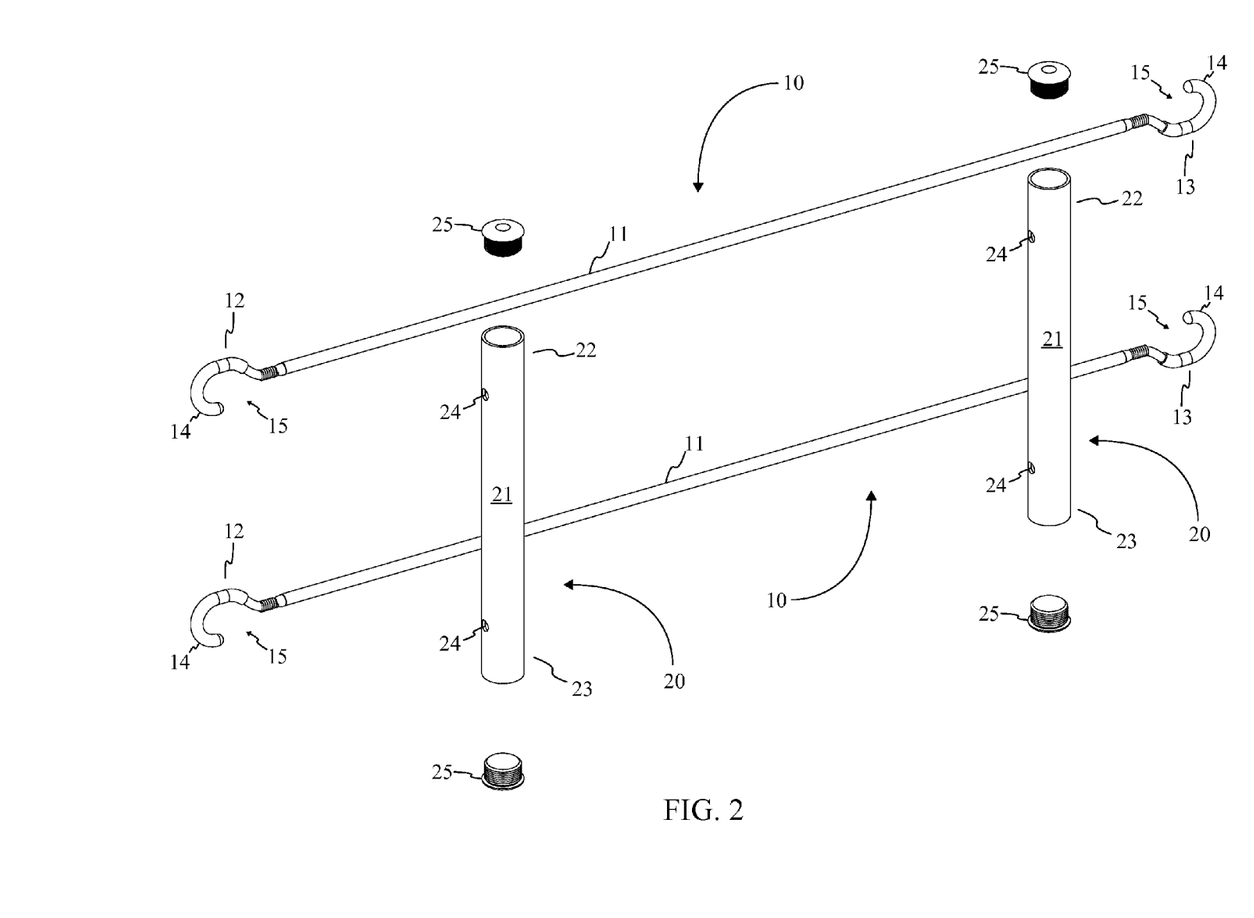
FIG. 2 is an expanded perspective view displaying the component positioning of the bilateral cargo strap system as per the current embodiment of the present invention.
Figure 3:
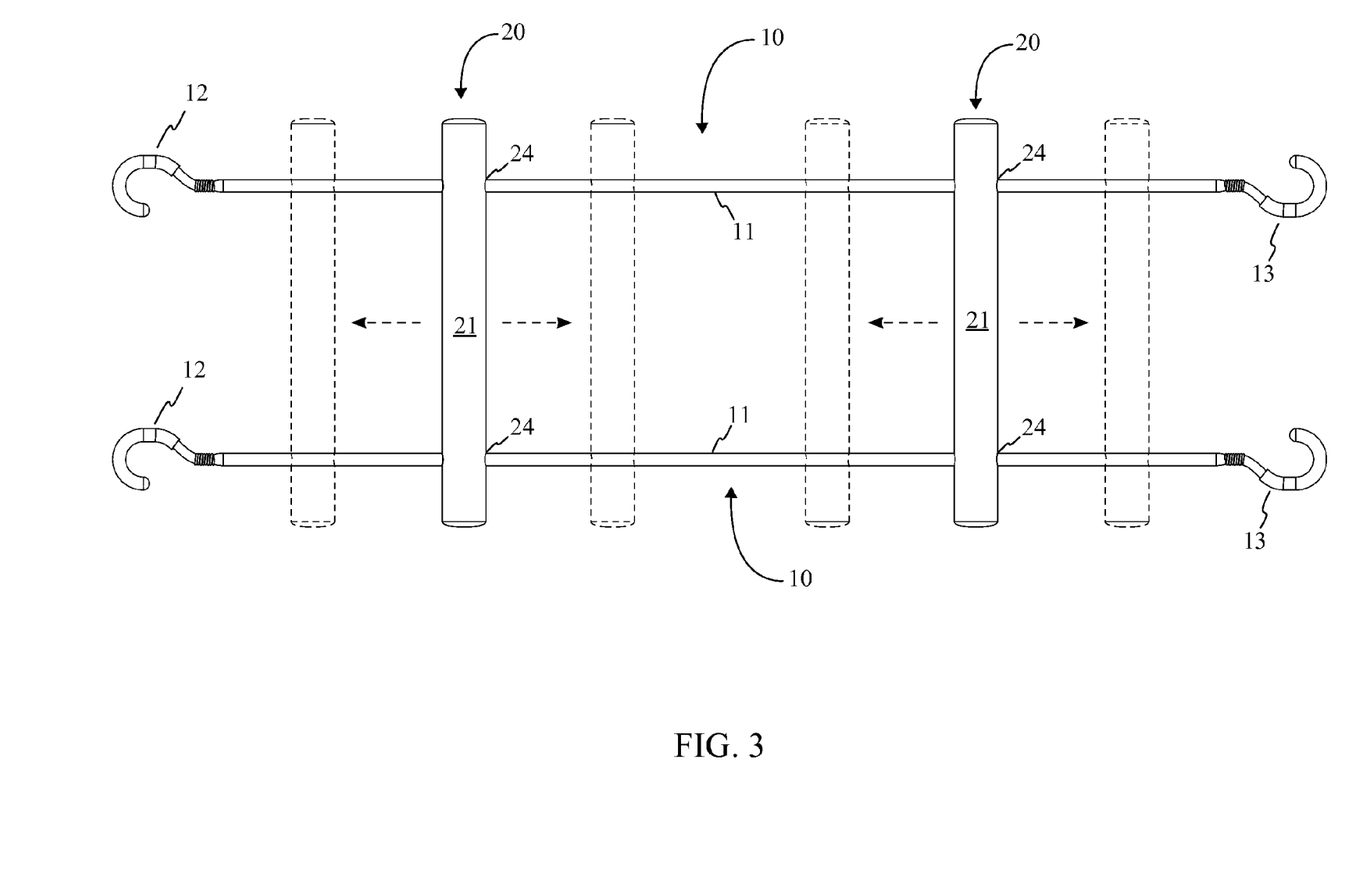
FIG. 3 is a front elevational view displaying the adjustable positioning of the stabilizing rods along the length of the elongated cable section of the elastic straps.
Figure 4:
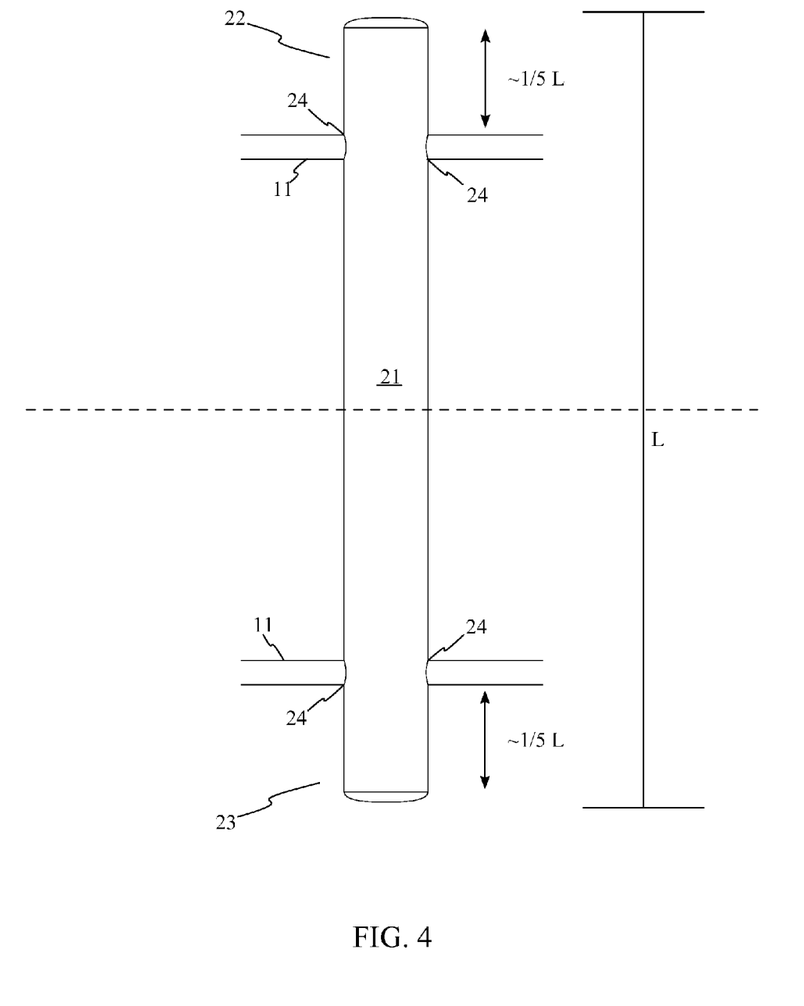
FIG. 4 is an enhanced view displaying the symmetrical positioning of the elongated cable section as well as the positioning of the cable mounts relative to the length of the cylindrical body as per the current embodiment of the present invention.
Figure 5:
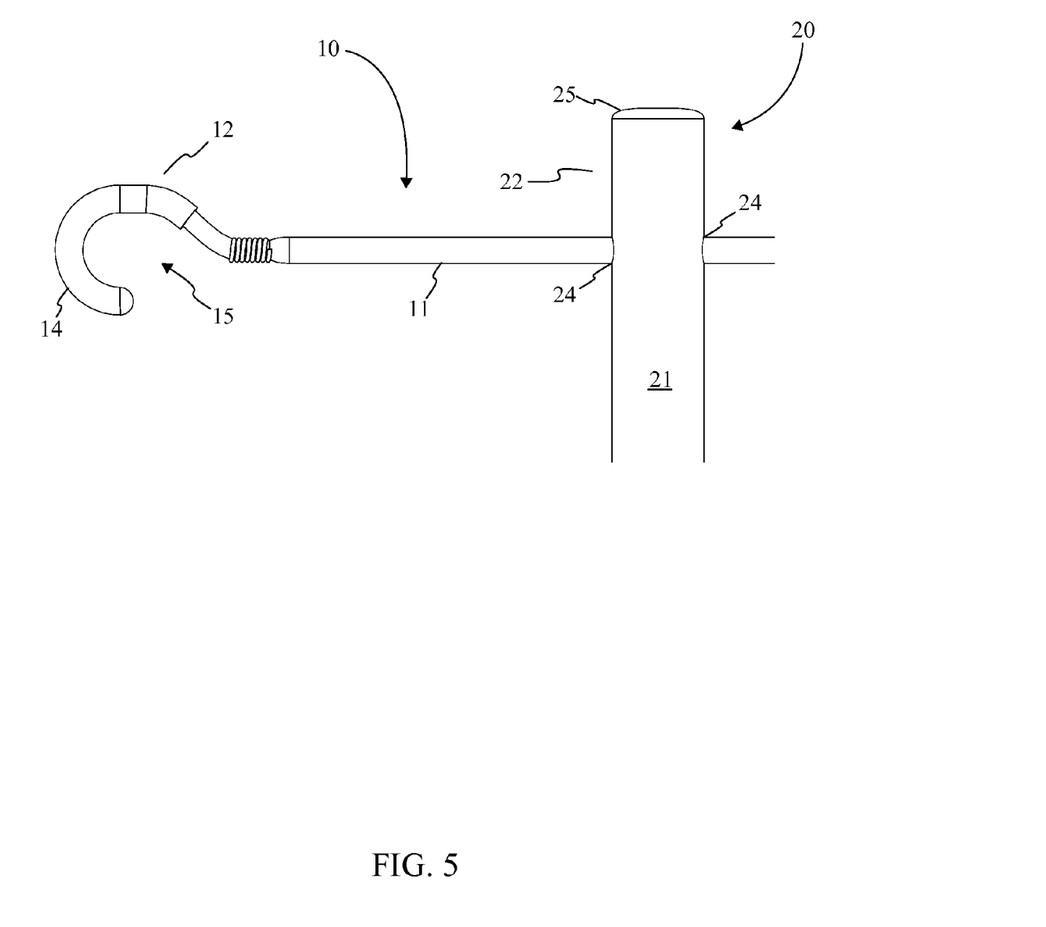
FIG. 5 is an enhanced view displaying the positioning of the protective cap over the hook section of the first coupler.
Figure 6:
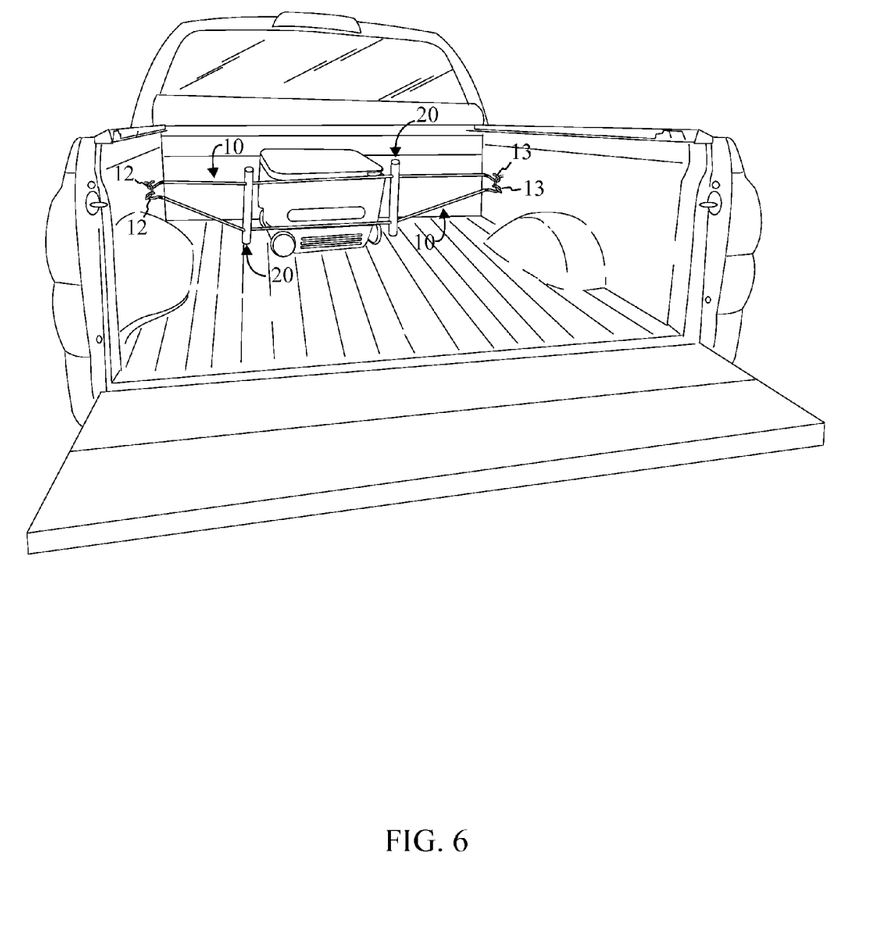
FIG. 6 is a perspective view displaying the bilateral cargo strap system securing cargo within the bed of a truck.

Referencing FIG. 1 and FIG. 2, the present invention is a bilateral cargo strap system that improves cargo retention through the use of laterally positioned stabilizing rods 20. In the current embodiment of the present invention, the bilateral cargo strap system comprises at least two elastic straps 10 and at least two stabilizing rods 20. The at least two elastic straps 10 are parallely positioned retaining features that elastically retain cargo within a storage area. The at least two stabilizing rods 20 are perpendicularly positioned on the at least two elastic straps 10 and prevent unwanted movement of the at least two elastic straps 10.

Referencing FIG. 1-6, the at least two elastic straps 10 function as the means of retaining cargo within a storage area. The at least two elastic straps 10 mount to engageable features within a storage area and traverse across cargo, elastically retaining it in place. The at least two elastic straps 10 traverse through each stabilizing rod 20 of the at least two stabilizing rods 20. Each elastic strap 10 of the at least two elastic straps 10 are threaded through the stabilizing rods 20. The at least two elastic straps 10 are symmetrically positioned on each stabilizing rod 20 of the at least two stabilizing rods 20. The symmetrical positioning provides an even distribution of compression force against the retained cargo. In the current embodiment of the present invention, each elastic strap 10 of the at least two elastic straps 10 comprise an elongated cable section 11, a first coupler 12, and a second coupler 13. The elongated cable section 11 is the elastic member that that traverses through each stabilizing rod 20 and traverse across the retained cargo. The first coupler 12 and the second coupler 13 are elastically retained to one another by way of the elongated cable section 11. The first coupler 12 and the second coupler 13 function as the engagement features that securely mount an elastic strap 10 to the engageable features of the storage area. It should be noted that the elongated cable section 11 may be provided with any length necessary to enable its function within a storage area.

Referencing FIG. 1-3 and FIG. 5, the first coupler 12 and the second coupler 13 are oppositely positioned across the elongated cable section 11. The at least two stabilizing rods 20 are mounted between the first coupler 12 and the second coupler 13 on the elongated cable section 11. Referencing FIG. 3, each stabilizing rod 20 is adjustably positioned on the elongated cable section 11 between the first coupler 12 and the second coupler 13. The adjustable positioning allows each stabilizing rod 20 to be moveably positioned along the length of the elongated cable section 11 providing better stability and retention capabilities for the bilateral cargo strap system while securing retained cargo. Referencing FIG. 5, in the current embodiment of the present invention, the first coupler 12 and the second coupler 13 each comprise a hook and a protective cap 14. The hook section 15 is the structural feature that permits both the first coupler 12 and the second coupler 13 to mount to engageable features of the storage section. The protective cap 14 encases the hook section 15. The protective cap 14 prevents damage to the engageable features of the storage section.

Referencing FIG. 1-6, the at least two stabilizing rods 20 are perpendicularly positioned to the at least two elastic straps 10. The at least two stabilizing rods 20 functions as the means of evenly distributing the compression force of the at least two elastic straps 10 against the retained cargo. The at least two stabilizing rods 20 accomplish this through the particular arrangement with the at least two elastic straps 10, where the at least two elastic straps 10 are symmetrically distributed on each stabilizing rod 20 of the at least two stabilizing rods 20. Furthermore, this distribution is assisted by the particular arrangement between each stabilizing rod 20. Each stabilizing rod 20 of the at least two stabilizing rods 20 is parallely positioned to another stabilizing rod 20 improving stability against the retained cargo. In the current embodiment of the present invention, each stabilizing rod 20 of the at least two stabilizing rods 20 comprise a cylindrical body 21, at least two cable mounts 24, and a pair of inserts 25. The cylindrical body 21 is the structural configuration of each of the at least two stabilizing rods 20. The cylindrical body 21 facilitates placement of the each of the at least two stabilizing rods 20 against the retained cargo. The at least two cable mounts 24 function as the engagement point with the at least two elastic straps 10. Each cable mounts 24 of the at least two cable mounts 24 is traversed by the elongated cable section 11 of an elastic strap 10. The traversal of an elongated cable section 11 facilitates the adjustable positioning of the particular stabilizing rod 20. Through the engagement of a cable mount 24 with the elongated cable section 11, the cylindrical body 21 is able to be movably positioned about the length of the elongated cable section 11. The pair of inserts 25 function as terminal features to the cylindrical body 21 that prevent unwanted damage to the retained cargo or the exposed surfaces of the storage area.

Referencing FIG. 2, the cylindrical body 21 is a hollow structure that is light weight and sturdy providing a favorable arrangement when secured against the retained cargo by the at least two elastic straps 10. The at least two cable mounts 24 are symmetrically distributed on the cylindrical body 21. The symmetrical distribution of the at least two cable mounts 24 ensures the symmetrical positioning of the at least two elastic straps 10. In the current embodiment of the present invention, the cylindrical body 21 comprises a first end 22 and a second end 23. The first end 22 and the second end 23 are the opposing terminal regions of the cylindrical body 21. The first end 22 and the second end 23 are coincident with the face sides of the cylindrical body 21. The pair of inserts 25 are terminally positioned on the cylindrical body 21, where each insert 25 of the pair of inserts 25 is coincident with either the first end 22 or the second end 23. The inserts 25 partially traverse into the cylindrical body 21 becoming securely emplaced on either the first end 22 or the second end 23. The at least two cable mounts 24 are found positioned between the first end 22 and the second end 23. Referencing FIG. 4, in the preferred embodiment of the present invention, the at least two cable mounts 24 are particularly positioned relative to the total length of the cylindrical body 21 and the pair of inserts 25. A cable mount 24 of the at least two cable mounts 24 is positioned approximately ⅕ the length of the cylindrical body 21 away from the insert 25 coincident with the first end 22. Similarly, another cable mount 24 of the at least two cable mounts 24 is positioned approximately ⅕ the length of the cylindrical body 21 away from the other insert 25 coincident with the second end 23. The approximate length away from each insert 25 of the pair of inserts 25 was experimentally determined to provide the most favorable stability for the bilateral strap system when retaining cargo within a storage area.

Figure 9:
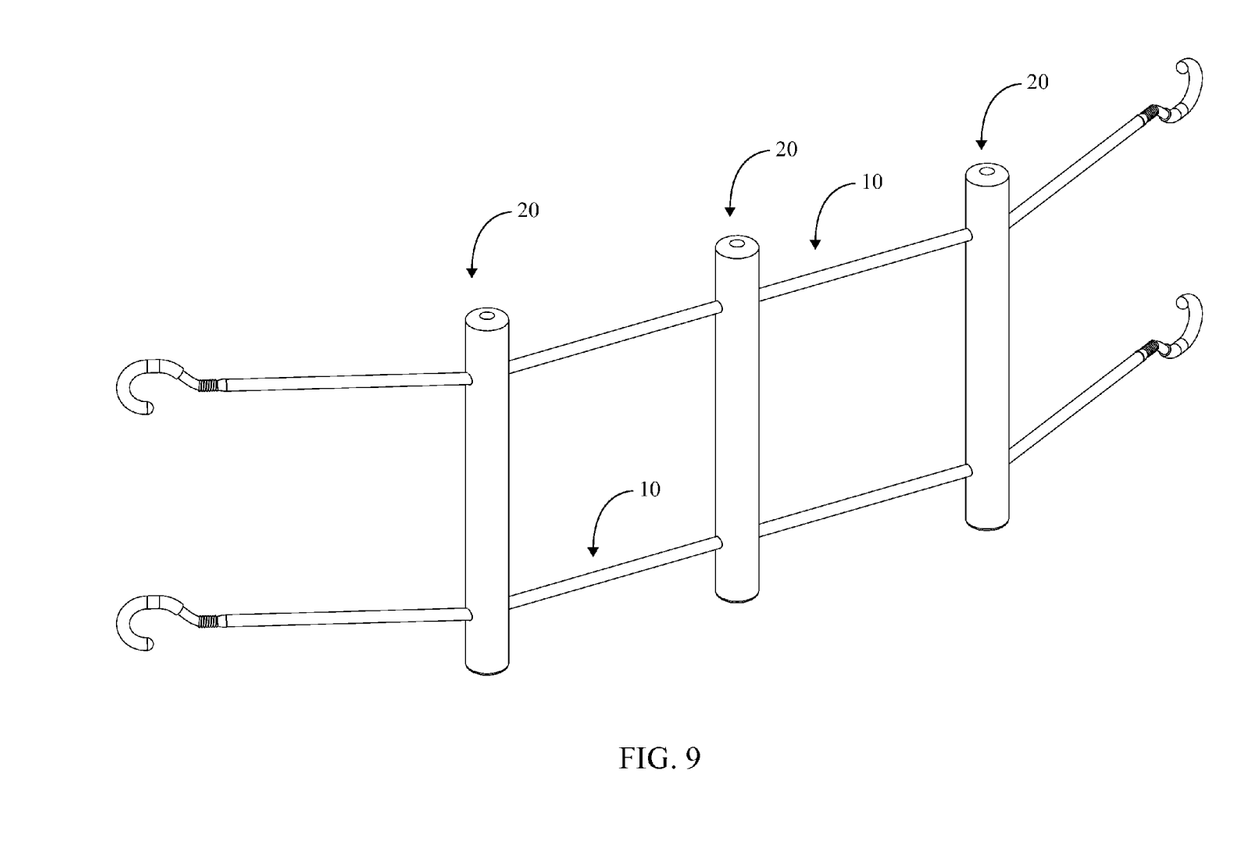
FIG. 9 is a perspective view displaying the bilateral cargo strap system configured with three stabilizing rods.
Figure 10:
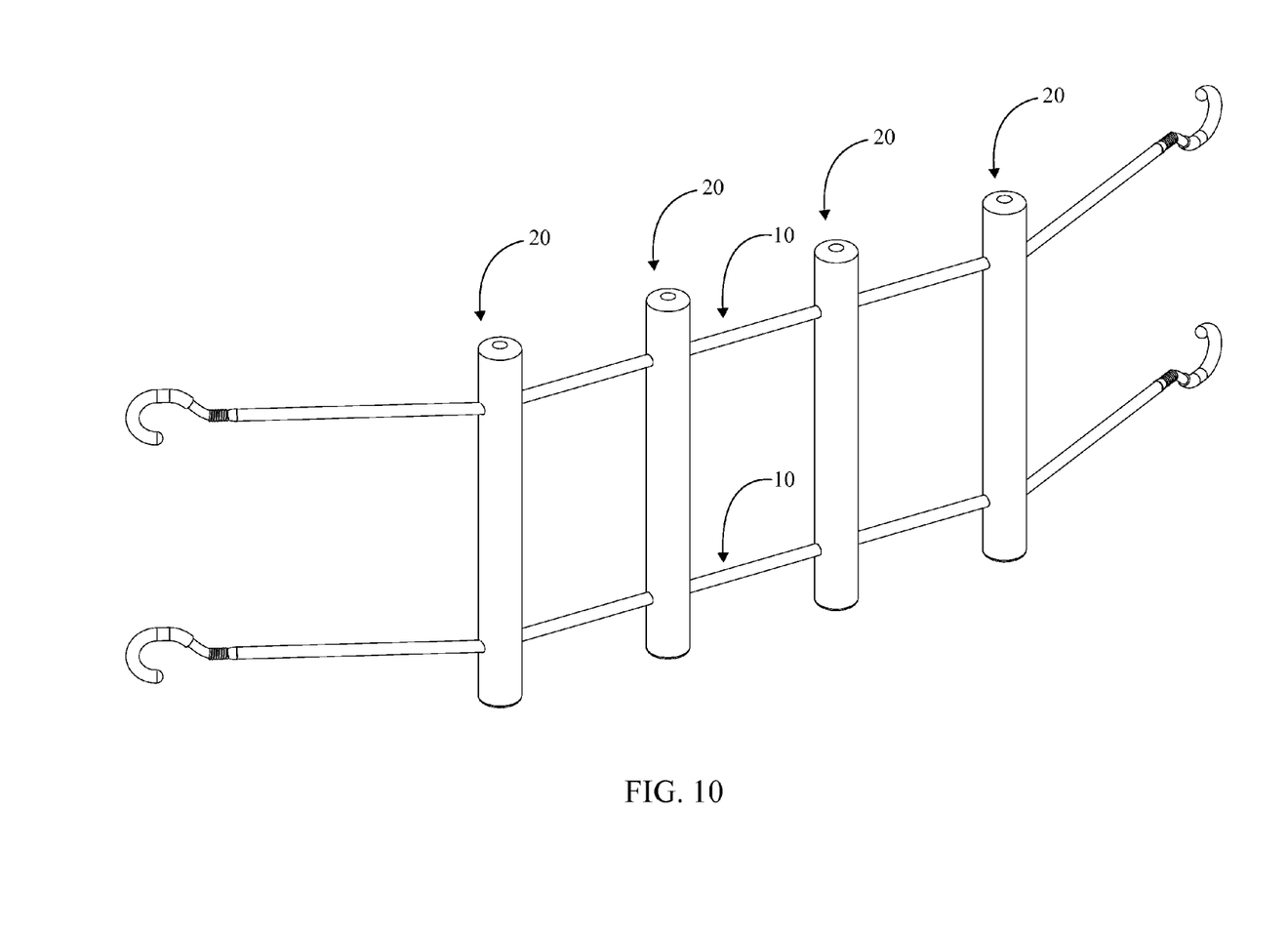
FIG. 10 is a perspective view displaying the bilateral cargo strap system configured with four stabilizing rods.

Referencing FIG. 9 and FIG. 10, in an embodiment of the present invention, the at least two stabilizing rods 20 comprise at most four stabilizing rods 20. By providing the present invention with at least two stabilizing rods 20 and at most four stabilizing rods 20, the bilateral cargo strap system is provided with three configurations consisting of a two stabilizing rod 20 configuration, a three stabilizing rod 20 configuration, and a four stabilizing rod 20 configuration. The three different configurations allow the bilateral cargo strap system to accommodate the at least two elastic strap 10 configured in a variety of lengths. The three different configurations ensure that the stabilizing rods 20 are able to distribute appropriately along the lengths of the at least two elastic straps 10 in order to secure a variety of differently shaped cargos.

Figure 7:
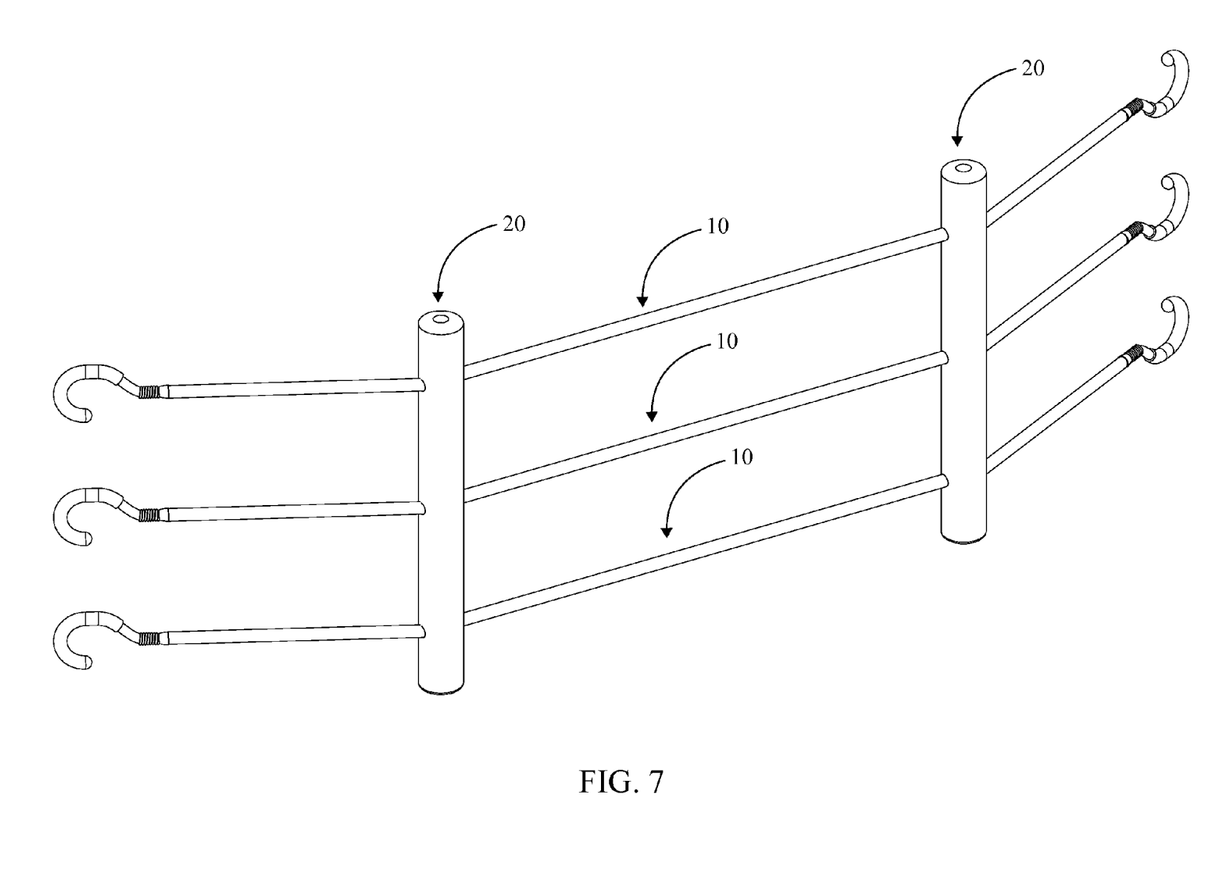
FIG. 7 is a perspective view displaying the bilateral cargo strap system configured with three elastic straps.
Figure 8:
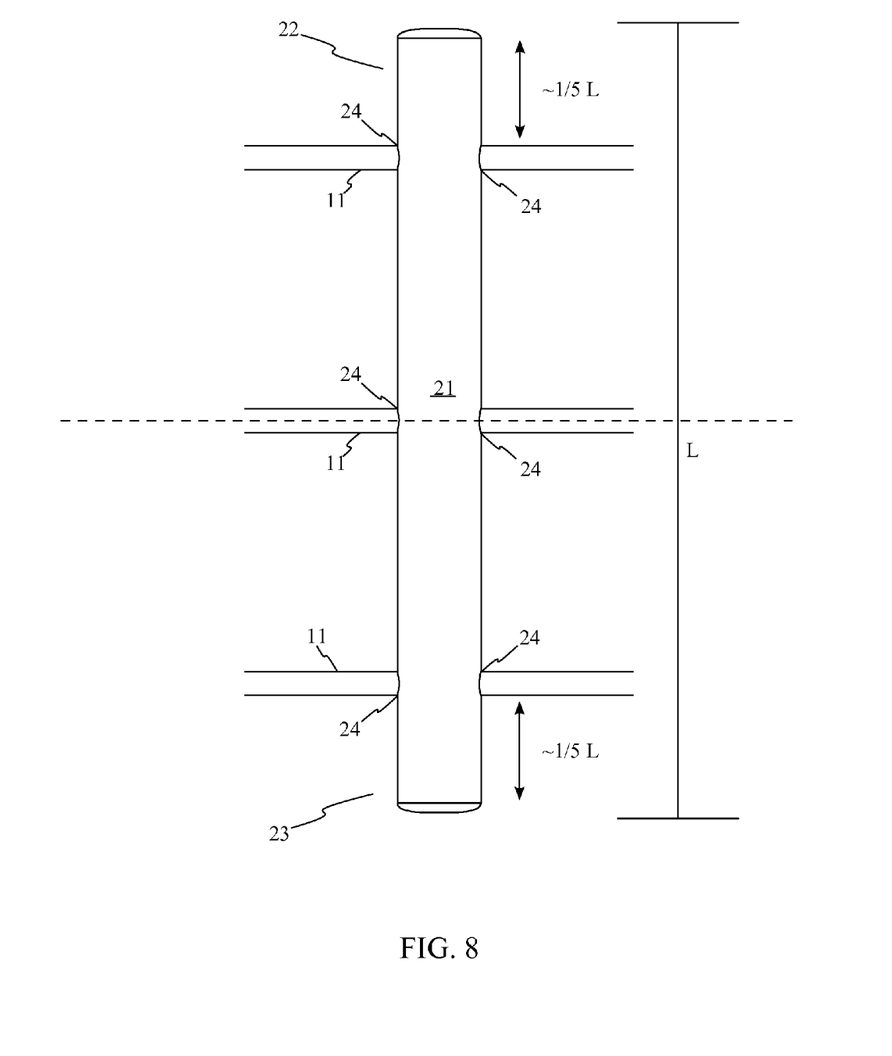
FIG. 8 is an enhanced view displaying the symmetrical positioning of the elongated cable section as well as the positioning of the cable mounts relative to the length of the cylindrical body as per the current embodiment of the present invention.

Referencing FIG. 7 and FIG. 8, in an embodiment of the present invention, the at least elastic straps 10 comprise three elastic straps 10. The three elastic strap 10 configuration is provided as a version of the present invention that offers additional tension compared to the two elastic strap 10 configuration. The three elastic strap 10 configuration is provided with the same symmetrical distribution as the at least two strap configuration with each of the stabilizing rods 20 but varies by having the third elastic strap 10 centrally traverse through each of the stabilizing rods 20. The third elastic strap 10 provides additional tension compared to the at least two elastic strap 10 configuration but additionally provides increased stability by providing an additional set of couplers. The first coupler 12 and the second coupler 13 of the third elastic strap 10 can be independently positioned relative to the first couplers 12 and second couplers 13 of other two other elastic straps 10 providing improved retention with the engageable features of the storage area.

Referencing FIG. 1-6, in the preferred embodiment, the present invention is a bilateral cargo strap system that utilizes a dual strap mechanism to secure cargo in place during transportation as well as stationary storage. The present invention comprises two elastic straps 10 and two stabilizing rods 20.

Referencing FIG. 1-6, the elastic strap 10 comprises an elongated cable section 11, a first coupler 12, and a second coupler 13. The elongated cable section 11 is not limited with respect to material and comprises one or more elastic strands that form a central core for the cord. The elongated cable sections 11 central core is covered by a woven sheath that spirals around the cord core. This allows the sheath to extend longitudinally along with the elastic core when the elongated cable section 11 is pulled. The first coupler 12 and second coupler 13 are hook shaped. The first coupler 12 and the second coupler 13 are composed of a durable material such as stainless steel and may be coated in a material such as polyvinyl chloride (PVC) to prevent damaging of the surfaces of the storage area or retained cargo.

Referencing FIG. 1-6, the stabilizing rods 20 each comprises a cylindrical body 21 of material with a top end and a bottom end that both accept the mounting of an insert 25. In the preferred embodiment of the present invention, the stabilizing rod 20 is composed of PVC although the stabilizing rod 20 is not limited with respect to material. The open top end and bottom end of the stabilizing rod 20 are sealed by the mounting of an insert 25. The insert 25 protects the interior of the cylindrical body 21 but additionally prevents the openings from catching on structures or elements of the cargo or storage area. The stabilizing rod 20 further comprises four circular openings that function as the cable mounts 24. The four circular openings extend through the stabilizing rod 20. The four circular openings are arranged in pairs with the first pair and the second pair located towards the top end and the bottom end of the stabilizing rod 20, respectively. The diameter of each circular opening is such that the elongated cable section 11 may slot through the circular opening while allowing the stabilizing rod 20 to slide along the elongated cable section 11.

Referencing FIG. 1-6, the present invention comprises two elastic straps 10 and two stabilizing rods 20. The two elastic straps 10 are slotted through the two upper pairs of circular openings and two lower pairs of circular openings present on the two stabilizing rods 20. This allows a user to adjust the positioning of the two stabilizing rods 20 by sliding the rod along the lengths of the elastic strap 10. In the preferred embodiment of the present invention, the stabilizing pipes may be locked in place relative to the elastic strap 10 by the user.

The object of the present invention is to provide users with a means of securing cargo during transportation or storage through tension in the elastic cords. The present invention is capable of holding cargo of both normal and irregular shapes in place without becoming dislodged or damaging the cargo. The present invention is particularly useful in mobile situations such as those involving cargo that must be secured within a truck bed. Oftentimes, cargo does not fully occupy the entire storage area of a truck bed and is prone to shifting and potentially becoming damaged during transportation. Additionally, the present invention may be used to secure cargo in stationary storage situations such as in a warehouse. The two retainer pipes of the bilateral cargo strap system prevent the two elastic cords from slipping from cargo during movement and assist in holding cargo in the desired position. The present invention has a wide variety of applications in terms of types of cargo including, but not limited to, kayaks, coolers, bicycles, lumber, and construction equipment. Furthermore, the present invention is available in a wide variety of sizes in order to accommodate varying user cargo needs.

Referencing FIG. 7-10, the present invention is a bilateral cargo strap system incorporating two elastic straps 10 and two stabilizing rods 20. However, alternative embodiments of the present invention may employ three or more elastic straps 10 and stabilizing rods 20 in order to secure larger and/or bulkier cargo. Additionally, multiple instances of the bilateral cargo strap system may be used to accomplish the same purpose of securing larger and/or bulkier cargo.

Although the invention has been explained in relation to its preferred embodiment, it is to be understood that many other possible modifications and variations can be made without departing from the spirit and scope of the invention as hereinafter claimed.

What is claimed is:

1. A bilateral cargo strap system comprises:
    at least two elastic straps;
    at least two stabilizing rods;
    each of the at least two straps comprises an elongated cable section, a first end coupler, and a second end coupler;
    each of the at least two stabilizing rods comprises a cylindrical body, at least two cable mounts, and a pair of inserts;
    the first coupler and the second coupler each comprise a hook section and a protective cap;
    the cylindrical body comprises a first end and a second end;
    each stabilizing rod of the at least two stabilizing rods being parallel to another stabilizing rod of the at least two stabilizing rods;
    the at least two stabilizing rods being traversed by the at least two elastic straps;
    each elastic strap of the at least two elastic straps being parallely positioned to another elastic strap of the at least two elastic straps;
    the at least two elastic straps being symmetrically distributed on each stabilizing rod of the at least two stabilizing rods; and
    each of the stabilizing rods being adjustably positioned along a length of the at least two elastic straps.

2. The bilateral cargo strap system as claimed in claim 1, wherein the at least two stabilizing rods comprises at most four stabilizing rods.

3. The bilateral cargo strap system as claimed in claim 1, wherein the at least two elastic straps comprise three elastic straps.

4. The bilateral cargo strap system as claimed in claim 1 comprises:
    the at least two cable mounts being symmetrically distributed on the cylindrical body;
    the at least two cable mounts being positioned between the first end and the second end;
    the elongated cable section traverse through a cable mount of the at least two cable mounts;
    the pair of inserts being terminally positioned on the cylindrical body;
    each insert of the pair of inserts being coincident with either the first end or the second end; and
    each insert of the pair of inserts partially traverse into the cylindrical body.

5. The bilateral cargo strap system as claimed in claim 4, wherein the cylindrical body being moveably positioned along the length of the elongated cable section by way of the cable mount.

6. The bilateral strap system as claimed in claim 4 comprises:
    a cable mount of the at least two cable mounts being positioned approximately ⅕ the length of the cylindrical body away from the insert coincident with the first end; and
    another cable mount of the at least two cable mounts being positioned approximately ⅕ the length of the cylindrical body away from the other insert coincident with the second end.

7. The bilateral cargo strap system as claimed in claim 1 comprises:
    the at least two stabilizing rods being mounted between the first coupler and the second coupler;

the first coupler and the second coupler being elastically retained to one another by way of the elongated cable section; and the hook section being encased by the protective cap.

8. A bilateral cargo strap system comprises:

at least two elastic straps;

at least two stabilizing rods;

each of the at least two straps comprises an elongated cable section, a first end coupler, and a second end coupler;

each of the at least two stabilizing rods comprises a cylindrical body, at least two cable mounts, and a pair of inserts;

the first coupler and the second coupler each comprise a hook section and a protective cap;

the cylindrical body comprises a first end and a second end;

each stabilizing rod of the at least two stabilizing rods being parallel to another stabilizing rod of the at least two stabilizing rods;

the at least two stabilizing rods being traversed by the at least two elastic straps;

each elastic strap of the at least two elastic straps being parallely positioned to another elastic strap of the at least two elastic straps;

the at least two elastic straps being symmetrically distributed on each stabilizing rod of the at least two stabilizing rods;

each of the stabilizing rods being adjustably positioned along a length of the at least two elastic straps;

the at least two cable mounts being symmetrically distributed on the cylindrical body;

the at least two cable mounts being positioned between the first end and the second end;

the elongated cable section traverse through a cable mount of the at least two cable mounts;

the pair of inserts being terminally positioned on the cylindrical body;

each insert of the pair of inserts being coincident with either the first end or the second end;

each insert of the pair of inserts partially traverse into the cylindrical body;

the at least two stabilizing rods being mounted between the first coupler and the second coupler;

the first coupler and the second coupler being elastically retained to one another by way of the elongated cable section; and the hook section being encased by the protective cap.

9. The bilateral cargo strap system as claimed in claim 8, wherein the at least two stabilizing rods comprises at most four stabilizing rods.

10. The bilateral cargo strap system as claimed in claim 8, wherein the at least two elastic straps comprise three elastic straps.

11. The bilateral cargo strap system as claimed in claim 8, wherein the cylindrical body being moveably positioned along the length of the elongated cable section by way of the cable mount.

12. The bilateral strap system as claimed in claim 8 comprises:

a cable mount of the at least two cable mounts being positioned approximately ⅕ the length of the cylindrical body away from the insert coincident with the first end; and another cable mount of the at least two cable mounts being positioned approximately ⅕ the length of the cylindrical body away from the other insert coincident with the second end.

13. A bilateral cargo strap system comprises:

at least two elastic straps;

at least two stabilizing rods;

each of the at least two straps comprises an elongated cable section, a first end coupler, and a second end coupler;

each of the at least two stabilizing rods comprises a cylindrical body, at least two cable mounts, and a pair of inserts;

the first coupler and the second coupler each comprise a hook section and a protective cap;

the cylindrical body comprises a first end and a second end;

each stabilizing rod of the at least two stabilizing rods being parallel to another stabilizing rod of the at least two stabilizing rods;

the at least two stabilizing rods being traversed by the at least two elastic straps;

each elastic strap of the at least two elastic straps being parallely positioned to another elastic strap of the at least two elastic straps;

the at least two elastic straps being symmetrically distributed on each stabilizing rod of the at least two stabilizing rods;

each of the stabilizing rods being adjustably positioned along a length of the at least two elastic straps;

the at least two cable mounts being symmetrically distributed on the cylindrical body;

the at least two cable mounts being positioned between the first end and the second end;

the elongated cable section traverse through a cable mount of the at least two cable mounts;

the pair of inserts being terminally positioned on the cylindrical body;

each insert of the pair of inserts being coincident with either the first end or the second end;

each insert of the pair of inserts partially traverse into the cylindrical body;

the at least two stabilizing rods being mounted between the first coupler and the second coupler;

the first coupler and the second coupler being elastically retained to one another by way of the elongated cable section;

the hook section being encased by the protective cap;

the cylindrical body being moveably positioned along the length of the elongated cable section by way of the cable mount;

a cable mount of the at least two cable mounts being positioned approximately ⅕ the length of the cylindrical body away from the insert coincident with the first end; and another cable mount of the at least two cable mounts being positioned approximately ⅕ the length of the cylindrical body away from the other insert coincident with the second end.

14. The bilateral cargo strap system as claimed in claim 13, wherein the at least two stabilizing rods comprises at most four stabilizing rods.

15. The bilateral cargo strap system as claimed in claim 13, wherein the at least two elastic straps comprise three elastic straps.

\* \* \* \* \*